(12) United States Patent
Nagata

(10) Patent No.: US 7,139,875 B2
(45) Date of Patent: Nov. 21, 2006

(54) DISK ARRAY APPARATUS AND CONTROL METHOD FOR DISK ARRAY APPARATUS

(75) Inventor: Koji Nagata, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 10/855,421

(22) Filed: May 28, 2004

(65) Prior Publication Data

US 2005/0228945 A1    Oct. 13, 2005

(30) Foreign Application Priority Data

Apr. 8, 2004    (JP) .............................. 2004-114189

(51) Int. Cl.
*G06F 12/00* (2006.01)

(52) U.S. Cl. ........................ 711/114; 711/165; 711/170

(58) Field of Classification Search ................ 711/114, 711/165, 170, 100
See application file for complete search history.

(56) References Cited

U.S. PATENT DOCUMENTS

| | | | |
|---|---|---|---|
| 5,403,639 A | 4/1995 | Belsan et al. |
| 5,991,859 A | 11/1999 | Nagasawa et al. |
| 6,260,125 B1 | 7/2001 | McDowell |
| 6,374,266 B1 | 4/2002 | Shnelvar |
| 6,442,706 B1 | 8/2002 | Wahl et al. |
| 6,473,775 B1 | 10/2002 | Kusters et al. |
| 6,584,551 B1 | 6/2003 | Huber |
| 6,594,744 B1 | 7/2003 | Humlicek et al. |
| 6,594,745 B1 | 7/2003 | Grover |
| 6,681,307 B1 | 1/2004 | Humlicek et al. |
| 6,694,413 B1 | 2/2004 | Mimatsu et al. |
| 6,718,436 B1 | 4/2004 | Kim et al. |
| 6,792,518 B1 | 9/2004 | Aramangau et al. |
| 2004/0030951 A1 | 2/2004 | Armangau |
| 2004/0068636 A1 | 4/2004 | Jacobson et al. |
| 2004/0210731 A1 | 10/2004 | Chatterjee et al. |

(Continued)

FOREIGN PATENT DOCUMENTS

JP    2001306407    11/2001

(Continued)

OTHER PUBLICATIONS

"SANworks by Compaq Virtual Replicator System Administrator's Guide" Product Version 3.0, Product Number AA-RMJFE-TE, 1st Edition (Jan. 2002), In Japanese, 2 pages and partial translation into English 2 pages.

*Primary Examiner*—Kimberly McLean-Mayo
(74) *Attorney, Agent, or Firm*—Mattingly, Stanger, Malur & Brundidge, P.C.

(57) ABSTRACT

Resources of a storage apparatus are utilized effectively by increasing and reducing a capacity of a differential LU used in a snapshot. In a disk array apparatus including a control processor which controls reading and writing of data with respect to a first logical volume which is generated using storage areas of a plural disk drives, performs control such that data in the past stored in the first logical volume is written in a second logical volume as differential data for each generation, and manages the differential data, the control processor manages a pool management table, in which a logical volume usable as the second logical volume is registered, and a pool addition object management table, in which a logical volume which can be added to the second logical volume is registered, and moves the logical volume from the pool addition object management table to the pool management table to thereby increase a capacity of the second logical volume.

13 Claims, 11 Drawing Sheets

U.S. PATENT DOCUMENTS

2004/0268035 A1    12/2004    Ueno
2004/0268067 A1    12/2004    Yamagami
2005/0027819 A1    2/2005    Nakano et al.

FOREIGN PATENT DOCUMENTS

POOL MANAGEMENT TABLE

| ITEM | GROUP 1 | GROUP 2 |
|---|---|---|
| OBJECTIVE PRIMARY LU | LU0, LU3 | LU5, LU7 |
| POOL REGISTRATION LU | LU11, LU12 | LU21, LU22 |
| POOL AUTOMATIC ADDITION OBJECT LU | LU31, LU32, LU33 | LU31, LU32, LU33 |
| POOL AUTOMATIC ADDITION CONDITIONS (FOLLOWING ITEMS MAY BE SELECTED) (1) SEPARATE FOR EACH GROUP (2) COMMON TO EACH GROUP (3) DESIGNATE MAXIMUM VOLUME OF POOL FOR EACH GROUP (4) DESIGNATE MINIMUM VALUE OF REMAINING CAPACITY FOR AUTOMATIC ADDITION OBJECTS | (2) | (3) MAX 1TB |

141 → GROUP 1 column
142 → GROUP 2 column

FIG. 9

POOL MANAGEMENT TABLE (FOR LU DELETION)

| ITEM | GROUP 1 | GROUP 2 |
|---|---|---|
| POOL DELETION OBJECT LUS<br>(FOLLOWING ITEMS MAY BE SELECTED)<br>(1) REGISTER ORDER OF DELETION OF LUS<br>(2) DELETE LUS IN ORDER OPPOSITE TO REGISTERED ORDER<br>(3) DELETE LUS IN ORDER OF SIZE | LU31, LU12 | . . . |
| AUTOMATIC DELETION CONDITIONS<br>(FOLLOWING ITEMS MAY BE SELECTED)<br>(1) CURRENT UTILIZATION OF POOL IS EQUAL TO OR LESS THAN SET VALUE<br>(2) UTILIZATION OF POOL AFTER DELETION OF LU IS EQUAL TO OR LESS THAN SET VALUE<br>ABOVE MAY ALSO BE SET DURING PERIOD FOR MONITORING | LESS THAN 30% CONTINUOUSLY FOR ONE WEEK | . . . |

DISK ARRAY APPARATUS AND CONTROL METHOD FOR DISK ARRAY APPARATUS

CROSS-REFERENCES TO RELATED APPLICATIONS

This application relates to and claims priority from Japanese Patent Application No. 2004-114189, filed on Apr. 8, 2004, the entire disclosure of which is incorporated herein by reference.

BACKGROUND OF THE INVENTION

1. Field of the Invention

The present invention relates to a disk array apparatus, and in particular to a management technique for a differential LU in a snapshot.

2. Description of the Related Art

In a computer system, a copy of a storage volume storing original data may be generated, for example, in the case in which data to be stored in a storage device is backed up. In this case, the storage volume storing original data and a storage volume storing copy data are required to have the same contents and keep consistency. Thus, it is necessary to stop update of the storage volume storing original data until generation of the copy is completed. However, in a computer system or the like in which high-availability is required, access to the storage volume storing original data cannot be stopped in some cases.

Therefore, a technique called snapshot has been developed. The snapshot keeps consistency at a certain point in time between the storage volume storing original data and the storage volume storing copy data such that the original data at a point in time can be referred to even if the original data is updated after the point in time (See JP-A-2001-306407).

According to the technique of snapshot, in the case in which the original data is updated after the point when consistency should be kept, the data at the point when consistency should be kept is stored in another storage volume. In other words, the original data is kept as it is unless it is updated, and the data at the point when consistency should be kept is stored in another storage volume as differential data if it is updated.

Although a snapshot function has an advantage that a capacity of a differential LU can be reduced compared with a capacity of a primary LU, differential data increases if an amount of data to be written from a host increases. Then, when utilization of the differential LU has reached 100%, the snapshot cannot be maintained. Consequently, if a large number of LUs are set as differential LUs, the LUs cannot be used for other applications in the case in which a large amount of data is not written.

SUMMARY OF THE INVENTION

It is an object of the present invention to increase and reduce a capacity of a differential LU, which is used in a snapshot, to thereby utilize resources of a storage device effectively.

The present invention provides a disk array apparatus which comprises: a host interface which is connected to a host apparatus and receives data from the host apparatus; a memory which is connected to the host interface and stores data to be exchanged with the host apparatus and control information on the data to be exchanged with the host apparatus; plural disk interfaces which are connected to the memory and perform control such that the data to be exchanged with the host apparatus is read from and written in the memory; plural disk drives which are connected to the plural disk interfaces and in which the data sent from the host apparatus is stored under the control of the plural disk interfaces; and a control processor which controls reading and writing of data with respect to a first logical volume which is generated using storage areas of the plural disk drives, performs control such that data in the past stored in the first logical volume is written in a second logical volume as differential data for each generation, and manages the differential data by providing a snapshot management table for managing the differential data in an area of the memory. In the disk array apparatus, the control processor manages a pool management table, in which a logical volume usable as the second logical volume is registered, and a pool addition object management table, in which a logical volume which can be added to the second logical volume is registered, and moves the logical volume from the pool addition object management table to the pool management table to thereby increase a capacity of the second logical volume.

According to the present invention, resources of a storage apparatus can be utilized effectively by increasing and reducing a capacity of LUs registered in a pool area.

BRIEF DESCRIPTION OF THE DRAWINGS

In the accompanying drawings:

FIG. 6 is an explanatory diagram of a pool management table in a second embodiment of the present invention;

FIG. 9 is an explanatory diagram of a pool management table in a third embodiment of the present invention;

DESCRIPTION OF THE PREFERRED EMBODIMENTS

Embodiments of the present invention will be hereinafter described with reference to the accompanying drawings.

Figure 1:
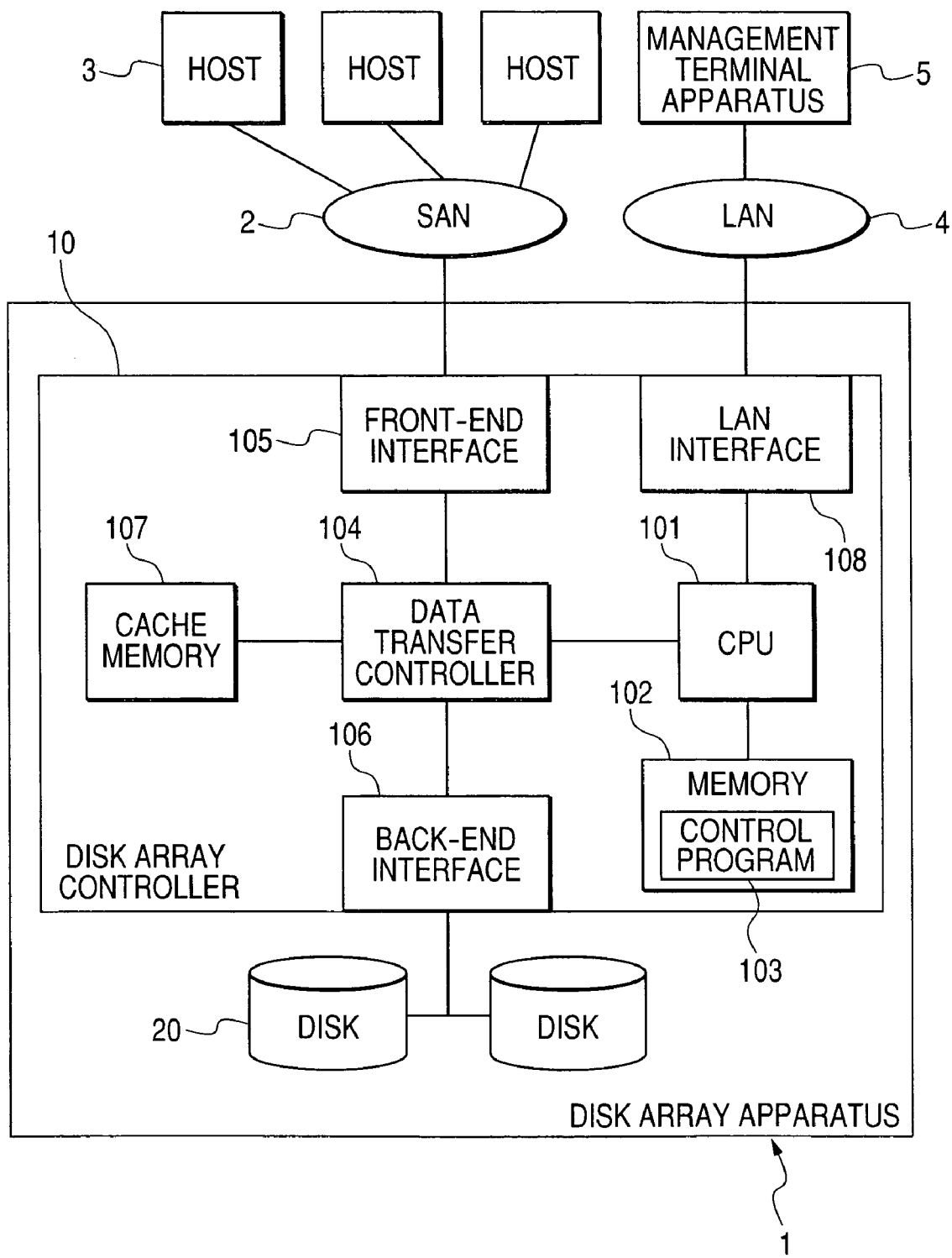
FIG. 1 is a diagram showing a structure of a disk array apparatus in an embodiment of the present invention.

FIG. 1 is a block diagram showing a structure of a disk array apparatus in an embodiment of the present invention.

A disk array apparatus 1 in the embodiment of the present invention includes a disk array controller 10 and disks 20. In addition, the disk array apparatus 1 is connected to plural hosts 3 via a SAN 2 and connected to a management terminal apparatus 5 via a LAN 4.

The disk array controller 10 controls input and output of data with respect to the disks 20 according to operations of a control program 103. In addition, a RAID (Redundant Array of Independent Disks) is constituted by the disks 20 to give redundancy to data to be stored. Consequently, stored data is not lost even if a failure occurs in a part of the disks.

The disk array controller 10 includes a CPU 101, a memory 102, a data transfer controller 104, a front-end interface 105, a back-end interface 106, a cache memory 107, and a LAN interface 108.

The control program 103 (see FIG. 2) is stored in the memory 102. The CPU 101 reads out and executes the control program 103, whereby various kinds of processing are performed.

The data transfer controller 104 transfers data among the CPU 101, the front-end interface 105, the back-end interface 106, and the cache memory 107.

The front-end interface 105 is an interface to the SAN 2, and sends and receives data and control signals to and from the hosts 3, for example, according to a fiber channel protocol.

The back-end interface 106 is an interface to the disks 20, and sends and receives data and control signals to and from the disks 20, for example, according to the fiber channel protocol.

The cache memory 107 includes a cache in which data to be sent and received between the front-end interface 105 and the back-end interface 106 is temporarily stored.

The data transfer controller 104 transfers data, which is read from and written in the disks via the SAN 4, between the interfaces 105 and 106. Moreover, the data transfer controller 104 transfers the data, which is read from and written in these disks, to the cache memory 107. Also, into the cache memory 107, the management tables 141 to 146 described below are also recorded.

The LAN interface 108 is an interface to the LAN 4, and can send and receive data and control signals to and from the management terminal 5, for example, according to a TCP/IP protocol.

The SAN 2 is a network which is capable of performing communication according to a protocol suitable for transfer of data such as the fiber channel protocol.

The host 3 is a computer apparatus including a CPU, a memory, a storage, an interface, an input device, and a display device, and makes it possible to use a database service, a web service, and the like utilizing data to be provided from the disk array apparatus 1.

The LAN 4 is used for management of the disk array apparatus 1 and is capable of communicating data and control information among computers, for example, according to the TCP/IP protocol. For example, Ethernet (registered trademark) is used as the LAN 4.

The management terminal apparatus 5 is a computer apparatus including a CPU, a memory, a storage, an interface, an input device, and a display device. A management program is operating in the management terminal apparatus 5. The management terminal apparatus 5 grasps an operation state of the disk array apparatus 1 and controls the operation of the disk array apparatus 1 according to the management program. Note that it is also possible that a client program such as a Web browser is operating in the management terminal apparatus 5, and the operation of the disk array apparatus 1 is controlled according to a management program which is supplied from the disk array apparatus 1 by a CGI (Common Gateway Interface) or the like.

Figure 2:
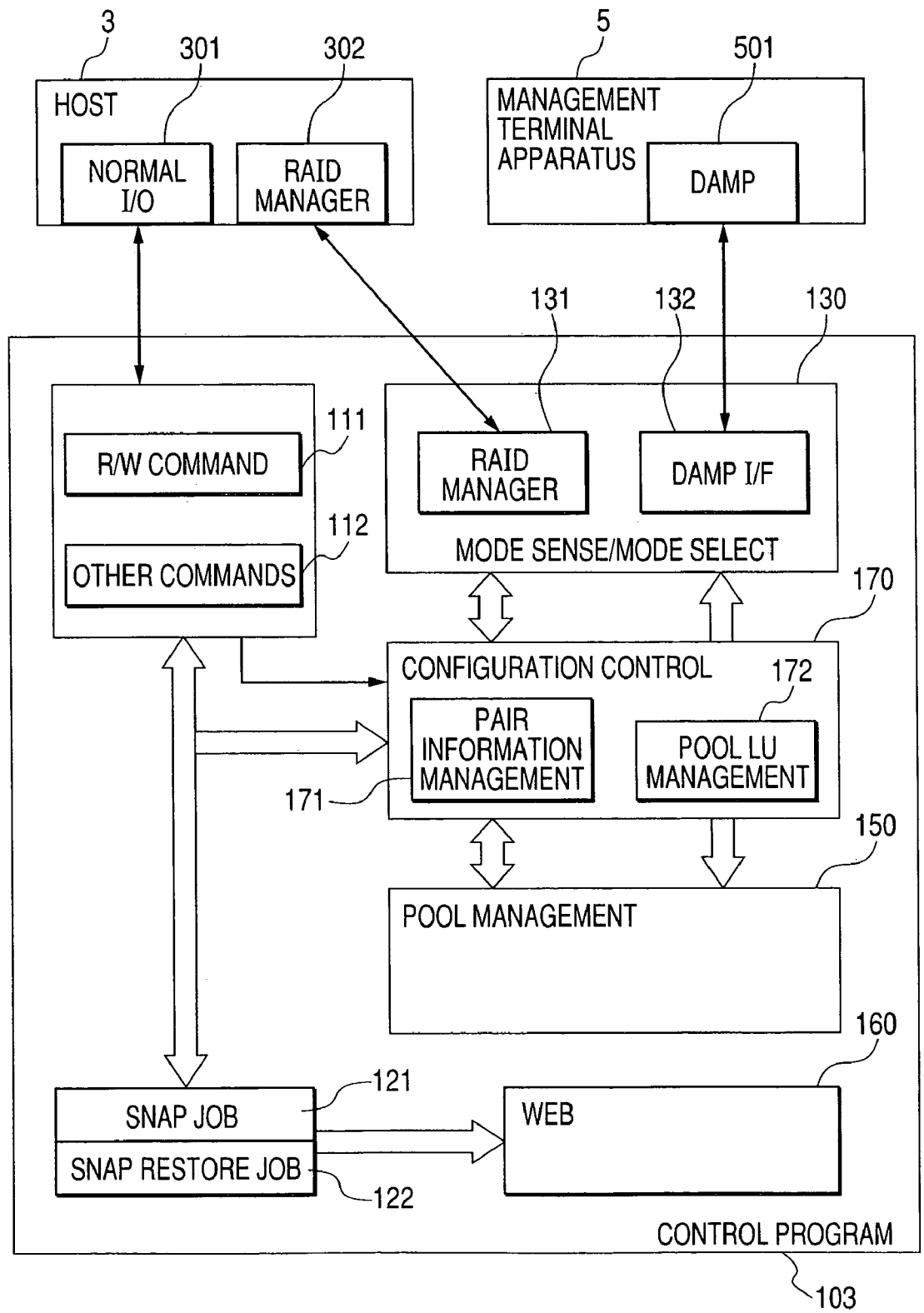
FIG. 2 is an explanatory diagram of a control program in the embodiment of the present invention.

FIG. 2 is an explanatory diagram of the control program 103 in the embodiment of the present invention.

A data input/output request sent from a normal I/O processing program 301 of the host 3 is analyzed by an R/W command analysis program 111 of the control program 103 of the disk array apparatus 1 and sent to a snap job program 121.

Upon receiving a request for writing data in a primary LU, the snap job program 121 copies data before update in the primary LU to a differential LU and updates contents of the primary LU after this copying. Moreover, the snap job program 121 updates a snapshot management table (a differential information management block 204) such that blocks in a virtual LU corresponding to blocks in the primary LU, in which the data is updated, are associated with blocks on the differential LU in which the data of the primary LU at a point of reception of a snapshot generation request (i.e., the data before update) is stored.

In addition, upon receiving a request for access to the virtual LU, a snap restore job program 122 accesses the blocks in the primary LU or the blocks in the differential LU, which are associated with the blocks in the virtual LU, with reference to the snapshot management table. This makes it possible for the disk array apparatus 1 to provide a snapshot image. Then, the host 3 can utilize information in the primary LU at the point of the issuance of the snapshot generation request by accessing the virtual LU according to the normal I/O processing program 301.

A control command sent from the normal I/O processing program 301 is analyzed by an other command analysis program 112 and sent to a configuration information control program 170.

Upon receiving a snapshot generation request, first, a pair information management program 171 of the configuration information control program 170 registers identification information for a new virtual LU in the snapshot management table, and reserves and initializes a differential bit map 202, a primary LU address table 203, and a differential information management block 204. Blocks of this virtual LU are associated with the blocks of the primary LU in a one-to-one relation according to the snapshot management table at first.

As described later, a pool LU management program 172 manages addition and deletion of LUs registered in a pool area.

A pool management program 150 performs management of reservation and release of an area in the snapshot differential management table (differential information management block 204), transition to an unused queue, and the like.

A WEB program 160 provides a WEB browser with a state of each pair created in snapshot (presence or absence of a failure in a pair obtained from information or the like in a pair information management table).

A RAID manager program 131 of the control program 103 of the disk array apparatus 1 is connected to a RAID manager program 302 of the host 3 so as to be capable of communicating with each other. Generation of a snapshot, change of a pair state, and the like can be performed according to the RAID manager programs 121 and 302.

In addition, a DAMP interface program 132 provides a user interface which performs various kinds of setting for a disk array such as deletion processing of a virtual LU. The DAMP interface program 122 is connected to a DAMP program 501 of the management terminal apparatus 5 so as to be capable of communicating with each other. Communication with the DAMP program 501 of the management terminal apparatus 5 is performed by this DAMP interface program 122, whereby setting for management of a configuration of the RAID of the disk array apparatus 1, and automatic addition and deletion of LUs in a pool is performed.

Figure 3:
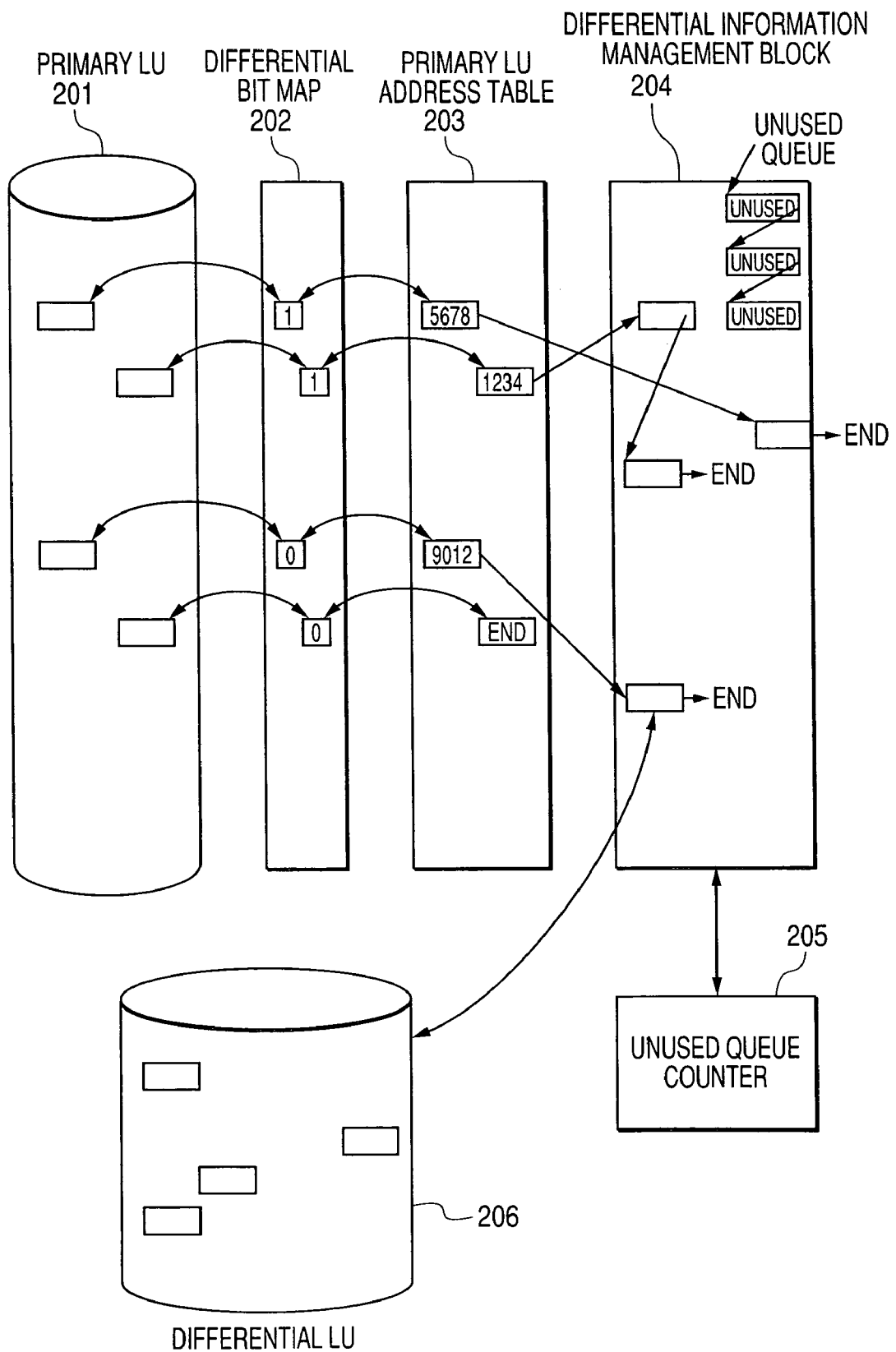
FIG. 3 is an explanatory diagram of a management method for a differential LU in the embodiment of the present invention.

FIG. 3 is an explanatory diagram of a management method for snapshot in the embodiment of the present invention.

A primary LU 201 is a logical unit (P-VOL: Primary Volume) which is served for a normal operation and becomes an object of data input and output to and from the host 3.

The differential bit map 202 is provided in a management area of the cache memory 107 and has bits corresponding to blocks of the primary LU 201 (e.g., 64 k bytes/block). This differential bit map 202 constitutes the snapshot management table together with the primary LU address table 203 and a differential information management block 204 to be described later.

In the case in which differential data corresponding to a block address of the primary LU 201 is recorded in a differential LU 206, bits in the differential bit map 202 corresponding to the primary LU 201 are "1". Therefore, when writing with respect to the primary LU 201 is performed, it can be judged if it is necessary to copy data before update to the differential LU 206 by referring to the differential bit map 202 (that is, if bit are "1", since data at the time of generation of snapshot has already been written in the differential LU 206, it is unnecessary to copy data of the primary LU 201 to the differential LU 206).

The primary LU address table 203 is provided in a management area of the cache memory 107. In the primary LU address table 203, addresses in the differential information management block 204 are recorded in association with bits in the differential bit map 202.

The differential information management block 204 has the same capacity as the differential LU 206 and is provided in the management area of the cache memory 107. The differential information management block 204 is partitioned for each of the blocks of the differential LU 206 (e.g., 64 k bytes/block), and a management table is provided in each of the partitioned parts of the differential information management block 204. This management table records correspondence between differential data recorded in a position corresponding to a block in the differential LU 206 and a generation of snapshot data. In addition, if there is other differential data corresponding to the block in the primary LU 201, the management table records information on a link to an address on the differential information management block 204 corresponding to the differential data. In other words, it is possible to refer to differential data of plural generations by tracing addresses recorded in the differential information management block 204.

Note that unused areas in the differential information management block 204 are linked as an unused queue. An amount of this unused queue is managed by an unused queue counter 205 provided in the cache memory 107.

The differential LU 206 is constituted by the LUs registered in the pool area. The data in the primary LU 201 at the time of creation of a snapshot is copied in this differential LU 206. It can be learned from a generation management bit map in the differential information management block 204 which generation of differential data the data in the differential LU 206 corresponds to.

Thus, in writing data in the primary LU 201, first, it is judged with reference to the differential bit map 202 whether it is necessary to copy data before update to the differential LU 206. Then, if a corresponding bit in the differential bit map 202 is "1", it is judged that it is unnecessary to copy the data before update to the differential LU 206, and the data is written in the primary LU 201. On the other hand, if a corresponding bit in the differential bit map 202 is "0", the data is written in the primary LU 201 after the data before update is copied to the differential LU 206.

Then, a link address with respect to differential data, which is set anew, is set in a block in the differential information management block 204 corresponding to a block in the primary LU 201. An address of the block of the differential information management block 204 is set in a primary LU address table if necessary. The corresponding bit in the differential bit map 202 is changed to "1", and a generation management bit map in the differential information management block 204, which corresponds to an address in the differential LU 206 in which the data before update is written, is set. Moreover, since the unused queue in the differential information management block 204 is used, the unused queue counter 205 is updated.

In addition, in accessing the virtual LU (V-VOL: Virtual Volume), an address in the differential information management block 204 is specified according to a block address in the virtual LU to be an object of access (equivalent to a block address in the primary LU 201) with reference to the primary LU address table 203, and it is specified whether there is differential data of a generation of the object of access according to a generation management bit map of the address in the differential information management block 204. Then, if there is differential data of a desired generation, differential data is read out from an address in the differential LU 206 corresponding to the address in the differential information management block 204 to provide an image of data of the virtual LU. On the other hand, if there is no differential data of the desired generation, differential data of the desired generation is searched with reference to a link address with respect to the other differential data. Further, if no differential data is differential data of the desired generation, data currently recorded in the primary LU 201 is provided as data of the virtual LU.

Figure 4:
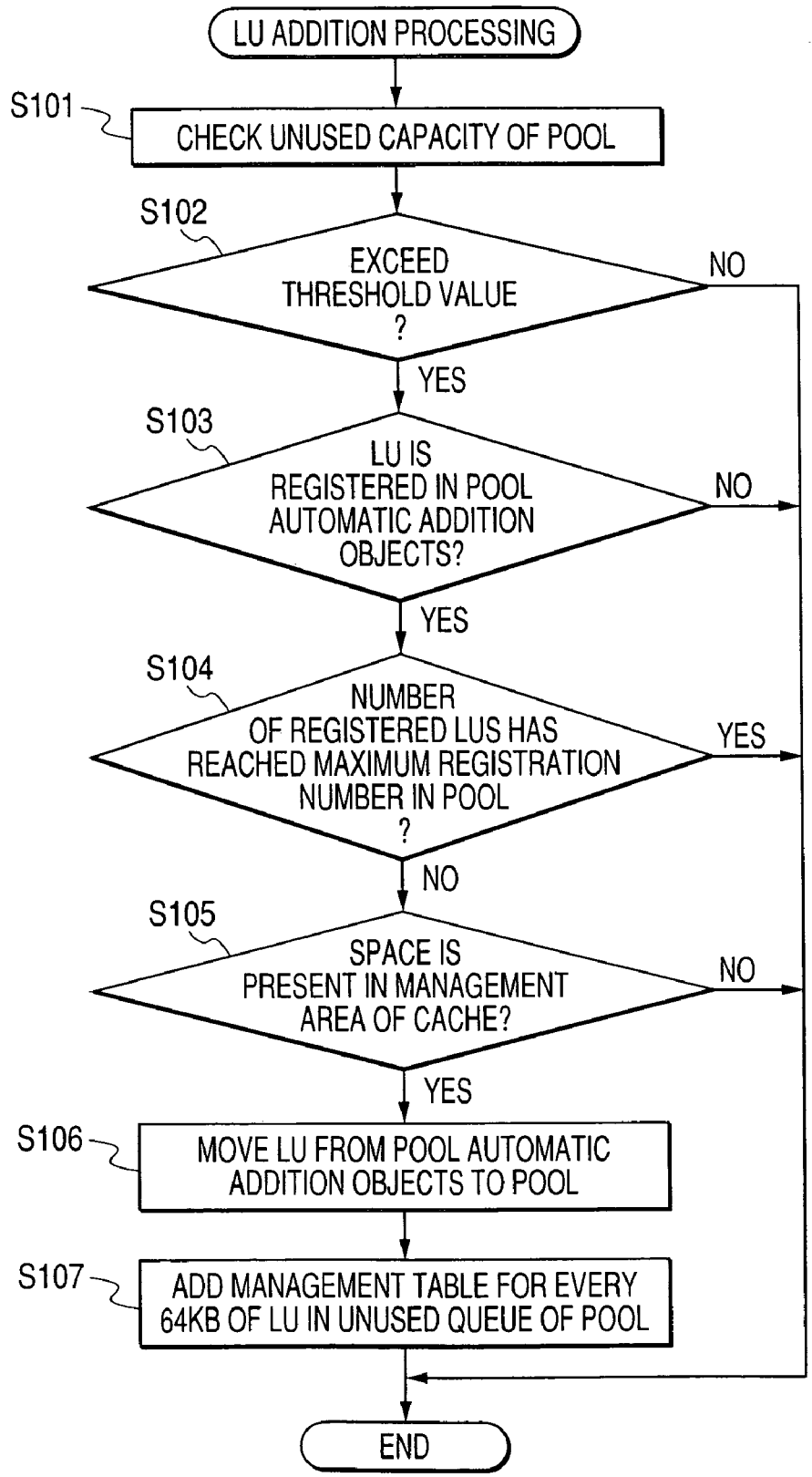
FIG. 4 is a flowchart of LU addition processing in a first embodiment of the present invention.

FIG. 4 is a flowchart of LU addition processing in a first embodiment of the present invention. The LU addition processing is executed by the pool LU management program 172 when a writing request for data is received from the host 3.

First, the program checks an unused capacity (or an already used capacity) of a pool area (differential LU) with reference to the unused queue counter 205 (S101).

Next, the program compares the utilization of the pool area acquired in step S101 and a threshold value decided in advance to judge whether or not the utilization of the pool area has exceeded the threshold value (S102). It is desirable to set this threshold value to about 70% allowing a margin such that the utilization of the pool area does not reach 100%. However, the threshold value can be changed according to an operation state (e.g., an amount of a data input/output request) of a storage apparatus.

In addition, execution of new LU addition processing can be prevented by setting a threshold value higher than a value at a normal time during execution of processing for adding an LU in the pool area (e.g., 75% as opposed to 70% at the normal time) regardless of the fact that LU addition processing is being executed because the utilization of the pool area has exceeded the threshold value.

Then, if the utilization of the pool area has not exceeded the threshold value, the program judges that it is unnecessary to add an LU and ends this processing without adding an LU. On the other hand, if the utilization of the pool area has exceeded the threshold value, the program proceeds to step S103.

Figure 5:
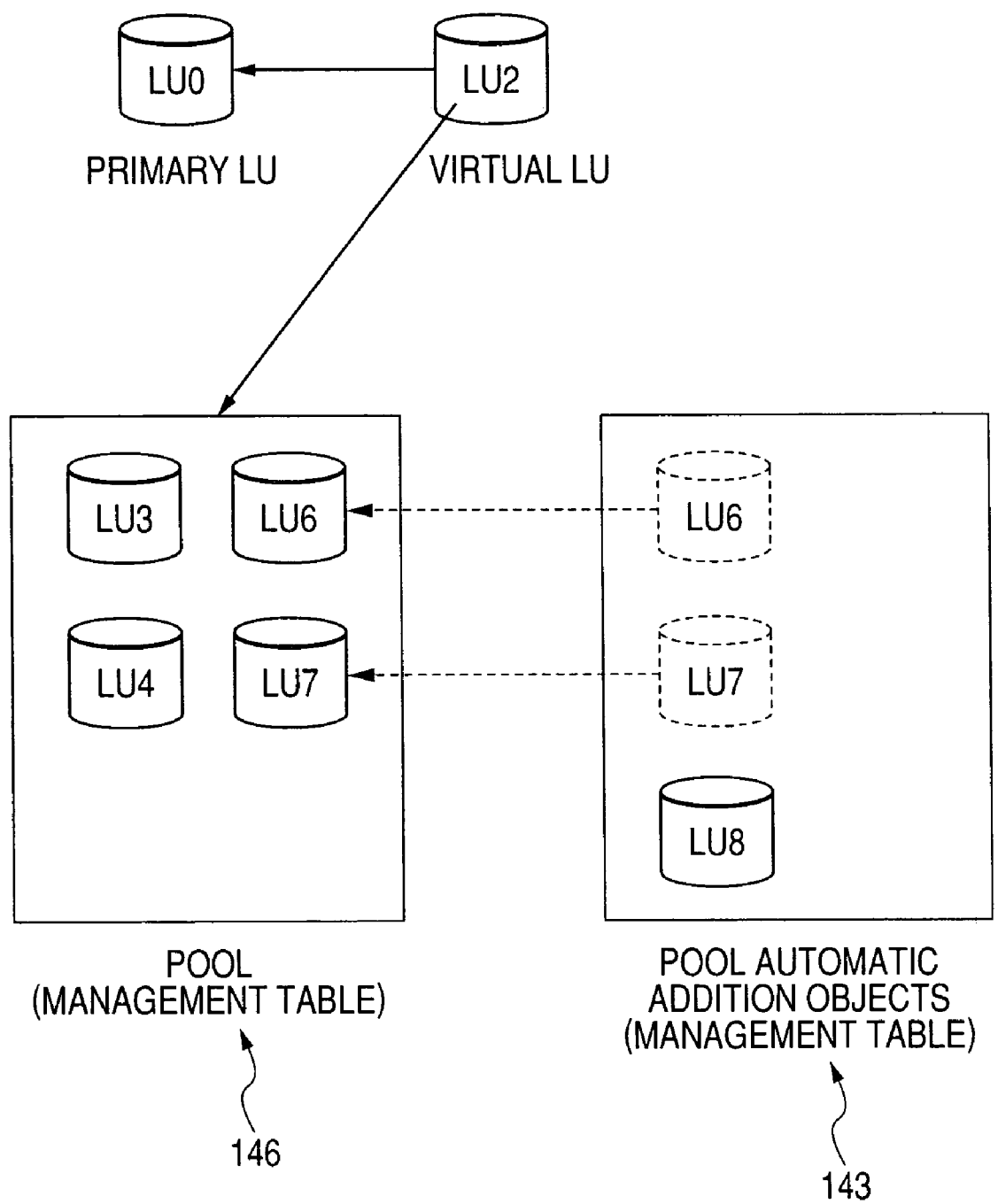
FIG. 5 is an explanatory diagram of the LU addition processing in the first embodiment of the present invention.

In step S103, the program judges whether or not LUs are registered in a pool automatic addition object with reference to the pool automatic addition object management table 143 (FIG. 5). If LUs are not registered in the pool automatic addition object, since an LU to be added is not present, the program ends this processing without adding an LU. On the other hand, if LUs are registered in the pool automatic addition object, the program proceeds to step S104.

In step S104, the program judges whether or not the number of LUs registered in the pool area have reached a maximum number with reference to a pool management table 146 (FIG. 5). The maximum value the number of registrations in the pool area is decided according to a capacity of the pool management table 146. If the number of LUs registered in the pool management table 146 has already reached the maximum number, since an LU cannot be added to the pool management table 146 anew, the program ends this processing without adding an LU. On the other hand, if the number of LUs registered in the pool management table 146 is less than the maximum number, the program proceeds to step S105.

In step S105, the program judges whether or not a space is present in the management area of the cache memory 107. This is because it is necessary to increase a capacity of the differential information management block 204 following the addition of an LU in the pool area. If no space is present in the management area of the cache memory 107, since the area in the differential information management block 204 cannot be increased, the program ends this processing without adding an LU. On the other hand, if a space is present in the management area of the cache memory 107, the program proceeds to step S106.

When conditions for adding an LU have been confirmed by the processing of S102 to S105, the program deletes an LU to be moved from the pool automatic addition object management table 143 and adds the LU in the pool management table 146 to make the LU usable as a differential LU (S106).

Plural LUs can be designated in the pool management table 146 in advance as the LUs to be moved. This makes it possible to add LUs by a necessary number. For example, if ten LUs of 100 GB are registered, three LUs of 100 GB are added in the pool area if a capacity of the pool area is 300 GB short, and the remaining seven LUs can be used for other applications.

Thereafter, the program sets an address of an unused queue, which is present in the area of the differential information management block 204 increased anew, in a last unused queue in the differential information management block 204 which has been present, and joins the unused queue increased anew to the unused queue which has been present (S107).

Note that this LU addition processing is executed in the case in which utilization of a pool area has exceeded a threshold value decided in advance. However, it is also possible that a higher second threshold value different from the threshold value is set, and when the utilization has exceeded this second threshold value, differential data stored in the pool area is deleted to immediately reserve an unused capacity of the pool area.

FIG. 5 is an explanatory diagram of LU addition processing in the first embodiment of the present invention.

A virtual LU (LU2), which provides an image of data at the time of generation of a snapshot, is provided with respect to a primary LU (LU0). This LU2 is a virtual logical unit which is constituted by data of the primary LU and differential data present in a pool area. In short, when the LU2 is accessed, it is judged whether data to be accessed is present in the primary LU or is the differential data present in the pool area to realize access to the differential LU.

As an LU to be added to the pool area, an LU registered in the pool automatic addition object management table 143 (LU6 and LU7) is deleted from the pool automatic addition object management table 143 and added in the pool management table 146. Consequently, the added LU can be used as a differential LU.

In this way, in the first embodiment of the present invention, plural LUs for increasing a capacity of the pool area are prepared in advance, and if utilization of the pool area has exceeded a certain threshold value, an LU is automatically added to the pool area to increase the capacity of the pool area and prevent the utilization of the pool area from reaching 100%. In addition, if the utilization of the pool area is small and it is unnecessary to add an LU, the LU can be used for other applications. Thus, a capacity of disks can be utilized effectively without registering an unnecessary disk as a pool area.

Next, a second embodiment of the present invention will be described.

Unlike the first embodiment, in the second embodiment of the present invention, a primary LU is divided into groups, and conditions for adding an LU in a pool area can be set for each of the groups.

FIG. 6 is an explanatory diagram of a pool management table of the second embodiment of the present invention.

The pool management table is divided into an area of a group 1 (141) and an area of a group 2 (142).

In addition, the pool management table includes an "objective primary LU" column in which primary LUs serving as primary volumes are registered, a "pool registration LU" column in which LUs, which have already been registered in the pool area and used as differential LUs, are registered, a "pool automatic addition object LU" column in which LUs, which are pool automatic addition objects, are registered, and a "pool automatic addition conditions" column in which conditions for automatic addition of an LU in the pool area are registered. In other words, the pool management table defines which LU is added at which timing.

More specifically, LU0 and LU3 belong to the group 1 as primary LUs, and LU11 and LU12 have already been added in the pool area. LU31, LU32, and LU33 are registered as group pool automatic addition objects. In short, LUs, which can be added for each of the groups, are defined individually, whereby a large quantity of LUs can be prevented from being added to the pool area for a specific group (specific primary LU).

In addition, since (2) is selected in the "pool automatic addition conditions" column of the group 1, an LU is added according to conditions set as conditions common to the groups. When separate for each group of (1) is selected, a threshold value for addition of an LU can be changed and defined for each of the groups. According to a maximum capacity of a pool area of each group of (3), a maximum quantity of LUs, which can be added to the group, can be defined, and a large quantity of LUs can be prevented from being added in the pool area for a specific group (specific primary LU). By designating a remaining capacity of automatic addition object LUs of (4), a large remaining capacity is reserved when an LU is added in a specific group, and the remaining LUs can be added in the other groups.

In the pool management table described above, groups are provided in association with primary LUs. However, groups of LUs may be provided in association with the hosts 3 or may be provided in association with application programs operating in the hosts 3.

Figure 7:
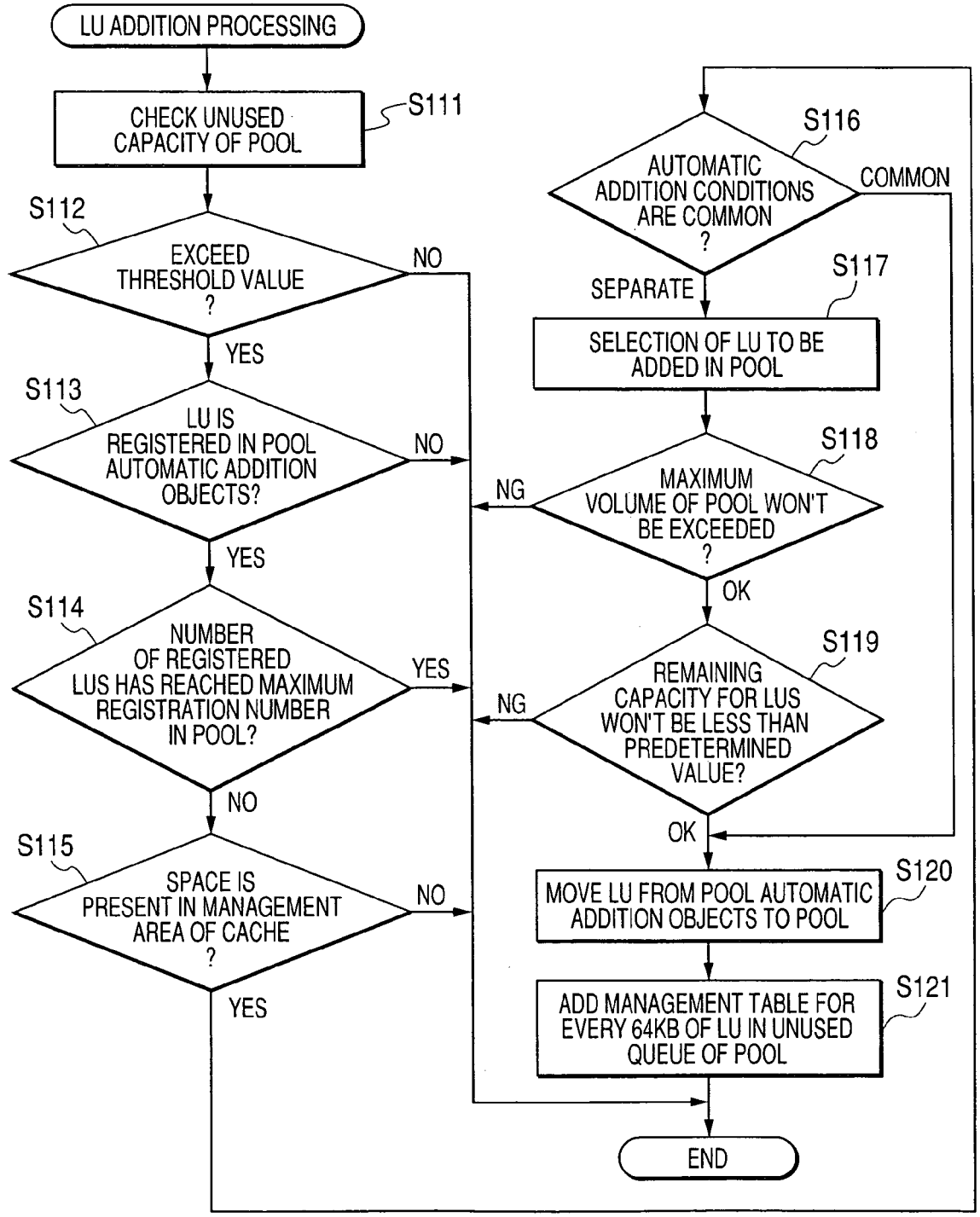
FIG. 7 is a flowchart of LU addition processing in the second embodiment of the present invention.

FIG. 7 is a flowchart of LU addition processing in the second embodiment of the present invention. The LU addition processing is executed by the pool LU management program 172 when a writing request for data is received from the host 3. The LU addition processing is executed for each group.

First, the program checks an already used capacity of a pool area (differential LU) with reference to the unused queue counter 205 (S111) and confirms conditions for adding an LU (S112 to S115). This processing is the same as the LU addition processing (S101 to S105 in FIG. 4) in the first embodiment.

Next, the program judges whether automatic addition conditions for LUs are common or individual (S116). If the automatic addition conditions for LUs are common, since individual conditions for the group are not set, the program shifts to step S120. On the other hand, if the automatic addition conditions for LUs are individual, the program confirms addition conditions for LUs set for the group.

First, the program selects an LU to be added to the group with reference to the "pool automatic addition object LU" column of the pool management table 146 or the like (S117). The program checks a maximum capacity of a pool area of the group to judge whether or not the maximum value is exceeded even if the LU selected in step S117 is added (S118). Then, when the maximum capacity of the pool area of the group is exceeded, the program judges that excessive LUs are allocated to the group, and ends this processing without adding an LU. On the other hand, if the maximum capacity of the pool area of the group is not exceeded, the program proceeds to step S119.

Next, in step S119, the program judges whether or not a remaining capacity of the pool automatic addition object LUs does not decrease to be less than a predetermined value even if the LU selected in step S117 is added. If the remaining capacity of the pool automatic addition object LUs has decreased to be less than the predetermined value, the program judges that operations of the other groups are affected, and ends this processing without adding an LU. On the other hand, if the remaining capacity of the pool automatic addition object LUs is not less than the predetermined value, the program proceeds to step S120.

Thereafter, when conditions for adding an LU have been confirmed, the program deletes an LU to be moved from the pool automatic addition object management table 143 and add the LU in the pool management table 146 to make the LU usable as a differential LU (S120).

Thereafter, the program sets an address of an unused queue, which is present in an area of the differential information management block 204 increased anew, in a last unused queue in the differential information management block 204 which has been present, and joins the unused queue increased anew to the unused queue which has been present (S121).

Figure 8:
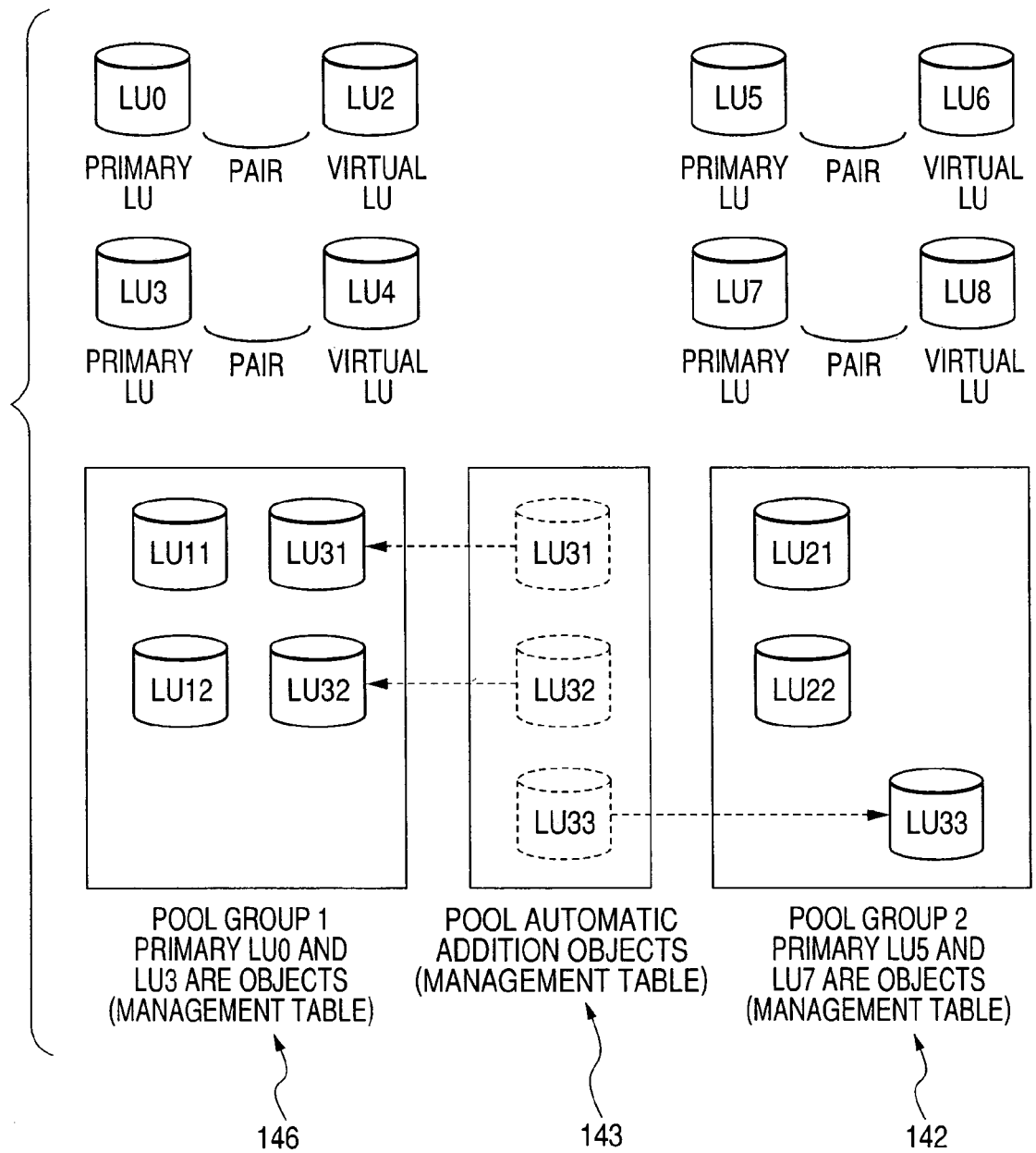
FIG. 8 is an explanatory diagram of the LU addition processing in the second embodiment of the present invention.

FIG. 8 is an explanatory diagram of LU addition processing in the second embodiment of the present invention.

A virtual LU (LU2), which provides an image of data at the time of generation of snapshot, is provided with respect to a primary LU (LU0). Similarly, a virtual LU (LU4) is provided with respect to a primary LU (LU3), a virtual LU (LU6) is provided with respect to a primary LU (LU5), and a virtual LU (LU8) is provided with respect to a primary LU (LU7).

In addition, LUs to be added in a pool area are registered in the pool automatic addition object management table 143. An LU31 to an LU33 are deleted from the pool automatic addition object management table 143, the LU31 and the LU32 are added in the pool management table 146 of the group 1, and the LU 33 is added in the pool management table 142 of the group 2. Consequently, the added LUs can be used as differential LUs of the respective groups.

In this way, in the second embodiment of the present invention, plural LUs are divided into groups, and a capacity of a pool area is automatically increased by a unit of the group, whereby setting with varied reliability for each group can be performed.

In addition, influence of data input/output from each host can be stopped locally. A pool area is managed by a unit of the disk array controller 10. When the host 3 runs away, and data writing instructions are continuously issued solely for LUs under the control of the host, a capacity of a pool area with respect to the LUs under the control of the host increases rapidly, and the other LUs cannot maintain a snapshot. Consequently, the LUs are divided into plural groups, and conditions for pool automatic addition are set for each of the groups, whereby a large quantity of LUs can be prevented from being added in the pool area for a specific group (specific primary LU).

Next, a third embodiment of the present invention will be described.

In the third embodiment of the present invention, the LUs, which are added in the pool area in the second embodiment, are deleted. Note that, although the case in which the LUs are divided into groups will be described as in the second embodiment, the third embodiment can also be applied to the first embodiment by considering only one group.

FIG. 9 is an explanatory diagram of a pool management table in the third embodiment of the present invention.

The pool management table (for LU deletion) is divided into an area of a group 1 (144) and an area of a group 2 (145). Note that, here, only the area of the group 1 (144) will be described.

The pool management table (for LU deletion) includes a "pool deletion object LU" column in which LUs, which are objects of deletion from a pool area, are registered, and an "automatic deletion object" column in which conditions for automatic deletion from the pool area are registered. In other words, the pool management table (for LU deletion) defines which LU is deleted at which timing.

More specifically, an order of deletion of LUs is defined so as to delete an LU 31 and an LU 12 in this order from the group 1. Note that, other than defining the order of deletion of LUs, it is also possible to delete the LUs in an order opposite to the order of registration of the LUs (i.e., from an LU registered last) or to delete the LUs in an order of a size of the LUs registered in the pool area (e.g., an LU with a small capacity is deleted preferentially, or an LU with a large capacity is deleted preferentially).

In addition, in the group 1, conditions for deletion of an LU are decided such that an LU is deleted from the pool area if utilization of the pool area is less than 30% continuously for one week. Note that, other than judging deletion of an LU according to the utilization of the pool area, it is also possible that utilization of the pool area after deletion of the LU is estimated to judge whether the LU should be deleted on the basis of a result of comparison of the estimated utilization of the pool area after deletion of the LU and a set value. Note that a period for monitoring the utilization of the LU can be set arbitrarily.

Figure 10:
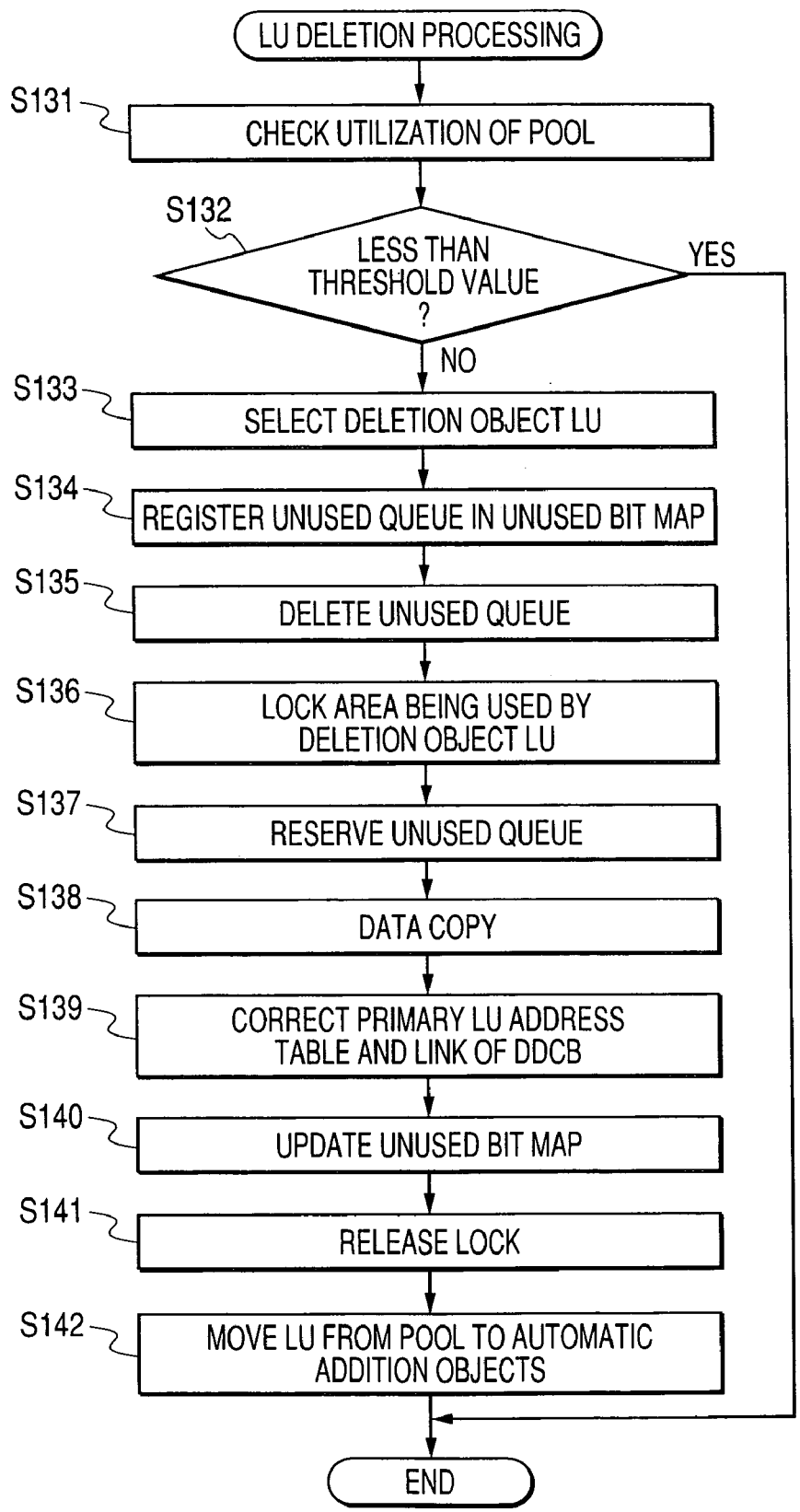
FIG. 10 is a flowchart of LU deletion processing in the third embodiment of the present invention.

FIG. 10 is a flowchart of LU deletion processing of a third embodiment of the present invention. The LU deletion processing is executed by the pool LU management program 172.

The pool LU management program 172 checks an already used capacity of a pool area (differential LU) with reference to the unused queue counter 205 at predetermined timing (S131). Next, the program compares utilization of the pool area acquired in step S101 and a threshold value decided in advance to judge whether or not the utilization of the pool area is less than the threshold value (S132). For example, the program checks a value of the unused queue counter 205 every hour to judge whether the utilization of the pool area is less than 30% for one week continuously. Conditions for judging the threshold value or the like are registered in the pool management table 144 or the like.

If the utilization of the pool area is not less than the threshold value, the program judges that it is unnecessary to delete an LU, and ends this processing. On the other hand, if the utilization of the pool area is less than the threshold value, the program selects an LU to be deleted (S133). The program selects the LU to be deleted with reference to the pool management table 144 or the like. For example, if (1) an order of LUs to be deleted is registered in the pool management table 144, the LUs can be deleted in accordance with the order. The LUs can also be deleted (2) in an order opposite to an order of registration of the LUs (i.e., an LU registered last is deleted first). The LUs can also be deleted in an order of a size of the LUs registered in the pool area (e.g., an LU with a small capacity is deleted preferentially, or an LU with a large capacity is deleted preferentially).

Note that, in the case in which an LU is deleted according to an instruction from an administrator rather than being deleted automatically, an LU to be deleted are designated in this step S133.

Thereafter, the program searches unused queues of the deletion object LU and creates an unused bit map (S134). This unused bit map is referred to in data copy from the deletion object LU (S138) and is used for copying only a block (not an unused queue) in use. In addition, utilization of the deletion object LU (a data amount required to be copied from the deletion object LU) can be found by creating the unused bit map.

Then, the program deletes the unused queues of the deletion object LU from the differential information management block 204 (S135). In other words, the program cancels links of addresses from unused queues of the other LUs to the deletion object LU to separate the unused queues of the deletion object LU and the unused queues of the other LUs and prevent the unused queues of the deletion object LU from being allocated anew.

Then, the program locks areas used by the deletion object LU such that data is not updated anew (S136).

Then, the program reserves unused queues, which are necessary for copying data from the deletion object LU, in LUs remaining in the pool area after the deletion of the LU (S137). Thereafter, the program copies the data from the deletion object LU to the LUs remaining in the pool area after the deletion of the LU (S138).

Thereafter, concerning the data copied from the deletion object LU, the program updates address information of the differential information management block 204 to be recorded in the primary LU address table 203 and updates links of addresses from differential data to be recorded in the differential information management block 204 (other differential data corresponding to the block of the primary LU 201) (S139).

Then, the program updates bits of an unused bit map concerning the block for which the data copy has ended (S140). This makes it possible to grasp a state of progress of copying.

Thereafter, when copying of all data ends, the program releases the lock of the areas used by the deletion object LU (S141). Then, the program deletes the LU to be move from the pool management table and adds the LU in the pool automatic addition object management table (S142).

Figure 11:
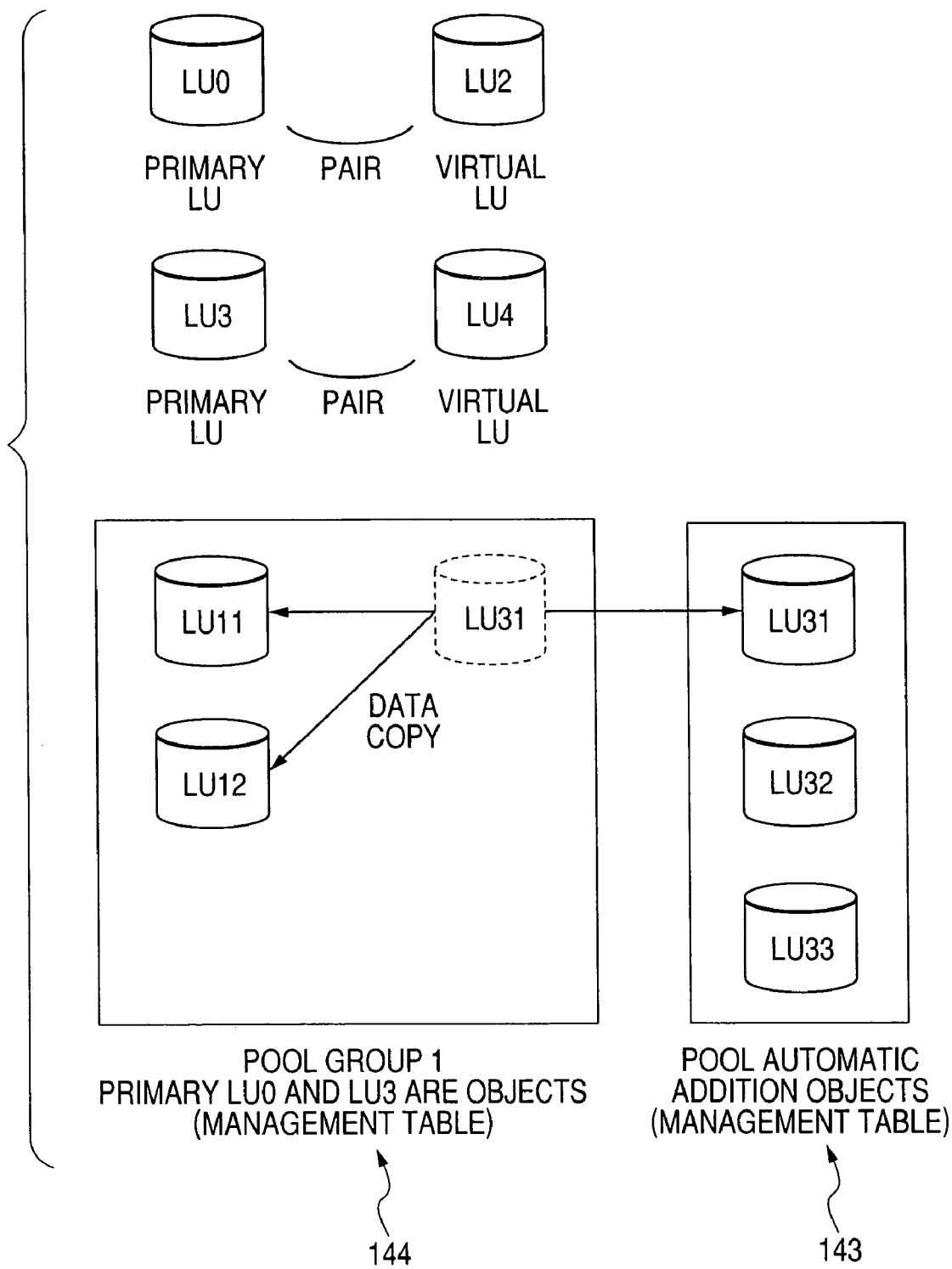
FIG. 11 is an explanatory diagram of the LU deletion processing in the third embodiment of the present invention.

FIG. 11 is an explanatory diagram of LU deletion processing in the third embodiment of the present invention.

A virtual LU (LU2), which provides an image of data at the time of generation of a snapshot, is provided with respect to a primary LU (LU0). Similarly, a virtual LU (LU4) is provided with respect to a primary LU (LU3).

LUs to be added in a pool area are registered in the pool automatic addition object management table 143. An LU is deleted from the pool management table 144 of the group 1 and added in the pool automatic addition object management table 143. Consequently, the deleted LU is added in pool areas of the other groups to make it possible to use the LU as a differential LU of the other groups.

In this way, in the third embodiment of the present invention, since an LU registered in a pool area is moved to a pool automatic addition object, the LU can be used for other applications, and resources can be utilized effectively.

In the case in which LUs more than a quantity actually required for a pool area of snapshot are registered, or in the case in which an I/O of a host (an application operating in a host) changes and a necessary capacity of a pool area (differential LU) decreases, reduction of a capacity of the pool area is not considered in the conventional technique. On the other hand, in the present invention, when an LU registered in the pool area is moved to a pool automatic addition object, since a currently used area is copied to an unused queue of another LU, and when all areas of a moving object LU has become unused, the LU is moved to the pool automatic addition object, the LU can be used for other applications. Thus, a disk capacity can be utilized effectively.

In addition, since the LU is moved from the pool area to the pool automatic addition object with reference to setting conditions, the disk capacity can be utilized effectively without troubling an administrator.

I claim:

1. A disk array apparatus comprising:
    a host interface which is connected to a host apparatus and receives data from the host apparatus;
    a memory which is connected to the host interface and stores data to be exchanged with the host apparatus and control information on the data to be exchanged with the host apparatus;
    plural disk interfaces which are connected to the memory and perform control such that the data to be exchanged with the host apparatus is read from and written in the memory;
    plural disk drives which are connected to the plural disk interfaces and in which the data sent from the host apparatus is stored under the control of the plural disk interfaces; and
    a control processor which controls reading and writing of data with respect to a first logical volume which is generated using storage areas of the plural disk drives, performs control such that data in the first logical volume prior to being updated by the writing of update data into the first logical volume, is copied and written in a second logical volume as differential data for each generation, and manages the differential data by providing a snapshot management table, which manages a relation among differential data for each generation stored in the second logical volume, in an area of the memory, wherein the control processor manages an amount of data stored in the second logical volume, increases a capacity of the second logical volume if the amount of data stored in the second logical volume has exceeded a first ratio of the capacity of the second logical volume, and reduces the capacity of the second logical volume to make it possible to use the reduced capacity of the second logical volume in other applications if the amount of data stored in the second logical volume has decreased to be less than a second ratio of the capacity of the second logical volume.

2. A disk array apparatus according to claim 1,
wherein the control processor manages a pool management table, in which a logical volume usable as the second logical volume is registered, and a pool addition object management table, in which a logical volume which can be added in the second logical volume is registered, increases the capacity of the second logical volume by adding a new logical volume in the pool management table, and reduces the capacity of the second logical volume by deleting a logical volume from the pool management table.

3. A disk array apparatus comprising:
a host interface which is connected to a host apparatus and receives data from the host apparatus;
a memory which is connected to the host interface and stores data to be exchanged with the host apparatus and control information on the data to be exchanged with the host apparatus;
plural disk interfaces which are connected to the memory and perform control such that the data to be exchanged with the host apparatus is read from and written in the memory;
plural disk drives which are connected to the plural disk interfaces and in which the data sent from the host apparatus is stored under the control of the plural disk interfaces; and
a control processor which controls reading and writing of data with respect to a first logical volume which is generated using storage areas of the plural disk drives, performs control such that data, stored in the first logical volume prior to being updated by the writing of update data into the first logical volume, is copied and written in a second logical volume as differential data for each generation, and manages the differential data by providing a snapshot management table, which manages the differential data, in an area of the memory,
wherein the control processor manages a pool management table, in which a logical volume usable as the second logical volume is registered, and a pool addition object management table, in which a logical volume which can be added in the second logical volume is registered, and increases a capacity of the second logical volume by moving a logical volume from the pool addition object management table to the pool management table.

4. A disk array apparatus according to claim 3,
wherein the control processor manages an amount of data stored in the second logical volume, and increases and reduces the capacity of the second logical volume by adding or deleting a logical volume in the pool management table on the basis of a result of comparison of the amount of data stored in the second logical volume and the capacity of the second logical volume.

5. The disk array apparatus according to claim 4,
wherein the control processor increases the capacity of the second logical volume by adding a new logical volume in the pool management table if the amount of data stored in the second logical volume has exceeded a first predetermined value.

6. A disk array apparatus according to claim 4,
wherein the control processor reduces the capacity of the second logical volume by deleting a logical volume from the pool management table if the amount of data stored in the second logical volume is less than a second predetermined value continuously for a predetermined period.

7. A disk array apparatus according to claim 4,
wherein the control processor reduces the capacity of the second logical volume by deleting a logical volume from the pool management table if the amount of data stored in the second logical volume is less than a third predetermined value even if the second logical volume is deleted.

8. A disk array apparatus according to claim 3,
wherein, by dividing the pool management table into groups, the control processor manages the first logical volume and the second logical volume for each of the groups, and increases and reduces a capacity of the second logical volume of each of the groups by adding a new logical volume to or deleting a logical volume from the pool management table of each of the groups on the basis of a result of comparison of an amount of data stored in the second logical volume of each of the groups and the capacity of the second logical volume of the group.

9. A disk array apparatus according to claim 8,
wherein the control processor increases the capacity of the second logical volume of each of the groups by adding a new logical volume to the pool management table of each of the groups if the amount of data stored in the second logical volume of each of the groups has exceeded a first predetermined value set in the group.

10. A disk array apparatus according to claim 9,
wherein the control processor adds a new logical volume in the pool management table of each of the groups if the capacity of the second logical volume of each of the groups does not exceed a second predetermined value even if the second logical volume is added.

11. A disk array apparatus according to claim 9,
wherein the control processor adds a new logical volume in the pool management table of each of the groups if a capacity of a logical volume, which can be added as the second logical volume, registered in the pool addition object management table does not decrease to be less than a third predetermined value even if the second logical volume is added.

12. A disk array apparatus according to claim 8,
wherein the control processor reduces the capacity of the second logical volume of each of the groups by deleting a logical volume from the pool management table of each of the groups if the amount of data stored in the second logical volume of each of the groups has decreased to be less than a fourth predetermined value set for the group.

13. A control method in a disk array apparatus comprising:
- a host interface which is connected to a host apparatus and receives data from the host apparatus;
- a memory which is connected to the host interface and stores data to be exchanged with the host apparatus and control information on the data to be exchanged with the host apparatus;
- plural disk interfaces which are connected to the memory and perform control such that the data to be exchanged with the host apparatus is read from and written in the memory;
- plural disk drives which are connected to the plural disk interfaces and in which the data sent from the host apparatus is stored under the control of the plural disk interfaces; and
- a control processor which controls reading and writing of data with respect to a first logical volume which is generated using storage areas of the plural disk drives, performs control such that data, stored in the first logical volume prior to being updated by the writing of update data into the first logical volume, is copied and written in a second logical volume as differential data for each generation, and manages the differential data by providing a snapshot management table, which manages a relation among differential data for each generation stored in the second logical volume, in an area of the memory,
- wherein the control processor manages an amount of data stored in the second logical volume, manages a pool management table, in which a logical volume usable as the second logical volume is registered, and a pool addition object management table, in which a logical volume which can be added to the second logical volume is registered, increases a capacity of the second logical volume by adding a new logical volume in the pool management table if the amount of data stored in the second logical volume has exceeded a first ratio of the capacity of the second logical volume, and reduces the capacity of the second logical volume to make it possible to use the reduced capacity of the second logical volume in other applications by deleting a logical volume from the pool management table if the amount of data stored in the second logical volume has decreased to be less than a second ratio of the capacity of the second logical volume.

* * * * *